(12) United States Patent
Haustein et al.

(10) Patent No.: US 8,098,137 B2
(45) Date of Patent: Jan. 17, 2012

(54) MEDIA PASSPORT SYSTEM

(75) Inventors: Nils Haustein, Soergenloch (DE); Craig A. Klein, Tucson, AZ (US); Frank Krick, Ockenheim (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/058,690

(22) Filed: Mar. 29, 2008

(65) Prior Publication Data

US 2009/0243800 A1 Oct. 1, 2009

(51) Int. Cl.
*H04Q 5/22* (2006.01)

(52) U.S. Cl. ............... 340/10.42; 340/10.1; 340/572.1; 340/539.13

(58) Field of Classification Search .............. 340/10.1, 340/10.3, 10.4, 572.1, 572.3, 5.2, 5.22, 5.41, 340/573.4

See application file for complete search history.

(56) References Cited

U.S. PATENT DOCUMENTS

| 6,873,260 | B2 | 3/2005 | Lancos et al. |
| 7,079,034 | B2 | 7/2006 | Stilp |
| 2003/0028787 | A1* | 2/2003 | Fayed et al. ............ 713/189 |
| 2004/0002305 | A1 | 1/2004 | Byman-Kivivuori et al. |
| 2004/0140906 | A1* | 7/2004 | Fujimoto ............ 340/825.49 |
| 2007/0057057 | A1 | 3/2007 | Andresky et al. |
| 2008/0186183 | A1* | 8/2008 | Nagai et al. ............ 340/572.1 |

FOREIGN PATENT DOCUMENTS

WO  WO 2007043139 A1 * 4/2007
WO  WO 2007/060494    5/2007

* cited by examiner

*Primary Examiner* — Nabil Syed
(74) *Attorney, Agent, or Firm* — McGinn Intellectual Property Law Group, PLLC

(57) ABSTRACT

A media passport system including a radio frequency identification (RFID) transponder attached to a removable medium a plurality of RFID readers installed in rooms, wherein each RFID reader has a unique identification (ID), and a security server connected to the plurality of RFID readers via a network. The security server hosts a zone-table including a unique ID information of the removable medium, and a zone information determined as a subset of the unique IDs of the plurality of RFID readers. Based on this the security server sends an alarm when a removable medium is transported inside or outside a zone.

1 Claim, 5 Drawing Sheets

100

MEDIA PASSPORT SYSTEM

BACKGROUND OF THE INVENTION

1. Field of the Invention

The present invention generally relates to removable media, and more particularly to a system and method that generates alerts when a removable medium containing valuable or confidential data is transported outside a predefined boundary.

2. Description of the Related Art

Removable media, such as removable disc, tape, optical or flash memory, are capable of being transported within and beyond the boundaries of an enclosure, such as a building or a room. This has advantages because data can be transported from one stationary computer to another. But the portability of removable media is also an increasing threat for enterprises because removable tape media also allows one to a) steal data and b) introduce undesired data such as viruses.

Current security technologies exist to prevent removable media from being taken outside of an established boundary. Such technology is for example based on video surveillance or other scanning techniques like X-Ray. Often, the carrier has to intentionally take out the removable medium out of a carrying device such as a briefcase or a pocket, and place the removable medium into the hardware for information retrieval. This process is cumbersome and time-consuming, especially if the carrier is already carrying other items. Also, in the case when the carrier intentionally conceals the removable medium and attempts to carry the removable medium outside of a room or building without permission, detection of the removable medium is impossible without his or her consent. In this case, the carrier may easily smuggle the removable medium out of a secured room or building, for example, by concealing the removable medium in his or her pocket.

Personal identification cards also exist where a person inserts a card before entering or exiting a room or building. However, the detection device for these identification cards do not detect whether the person is carrying any removable medium without permission.

Further, conventional security devices consist of local, stand-alone devices for detecting items being smuggled in or out a boundary. For example in shops such security devices are installed at the door to alert the seller if someone smuggles an item inside or outside the shop. These devices might be based on Radio Frequency Identification (RFID) where the items have an RFID transponder attached and the security device installed at the door includes a corresponding RFID reader. If an item with said RFID transponder passes the RFID reader included in the security device the security device might send an alert. To date, conventional security technology lacks a central control and tracking system for establishing and determining where removable media may be carried within an enclosure. Thus each security device has to be programmed individually and there is no central control system. In addition traditional security devices installed in shops work in a "all-or-nothing" mode where they send an alert for all items or none, but not for subsets of items.

SUMMARY OF THE INVENTION

Therefore, a system and method is required to control the presence of certain removable media in certain boundaries, such as offices and data centers, and to send alerts if the medium is transported outside of a desired boundary.

In view of the foregoing and other exemplary problems, drawbacks, and disadvantages of the conventional methods and structures, an exemplary feature of the present invention is to provide a system that alerts the user when a certain removable media device is transported inside or outside a given boundary, such as room, a building, an office complex, or a data center while no alert is sent when another removable media device is transported inside or outside the same boundary. The determination of which removable media device can be transported inside or outside a given boundary can be done at a central security server. A radio frequency identification (RFID) transponder is added to the each and every removable media device. Each device RFID transponder contains a unique identification (ID).

In addition, RFID readers are added within a building or computer center to establish certain boundaries. The RFID readers each transmit an AC signal containing radio frequency energy which is received by the RFID transponder when it is within range of detecting the transmitted AC signal. The AC signal is converted by the RFID transponder into DC power, which is then used to power the RFID transponder and generate a modular signal containing the unique ID of the RFID transponder. This modulated signal is backscattered to the RFID readers. The RFID readers receive the unique ID from the RFID transponder attached to the removable media when the RFID transponder passes by at least one of the RFID readers.

Additionally, a centralized security server is connected to each RFID reader in the building. The security server manages alerts based on the security level assigned to each removable medium, and the present location of removable media. Each removable medium, which can be identified based on the unique ID transmitted by said RFID transponder, has an assigned security level recorded within the security server. That security level defines the boundary in which a removable medium is allowed. The security server compares the security level assigned to the RFID transponder of the removable media device to the zone where the RFID transponder is detected, and decides whether to send an alert. The zone is determined by the RFID reader which detected said RFID transponder.

For example, a high security level might allow transportation of a removal medium only within a room of a building, whereas most security levels might allow the transportation of other removable media within other areas in the building. Alternatively, the removable medium can be associated with a particular zone, so that they cannot be moved to another zone even if the security level is appropriate. In this case, the fiscal security is scope based, rather than level-based.

In other words, the present media passport system and method includes a radio frequency identification (RFID) transponder attached to a removable medium a plurality of RFID readers installed in rooms, wherein each RFID reader has a unique identification (ID), and a security server connected to the plurality of RFID readers via a network. The security server hosts a zone-table including a unique ID information of the removable medium, a zone information determined as a subset of the unique IDs of the plurality of RFID readers, and a unique ID information of the plurality of RFID readers. The RFID transponder transmits a unique ID of the removable medium to an RFID reader when the RFID transponder passes by the RFID reader. The RFID reader transmits the unique ID of the removable medium and the unique ID of the RFID reader to the security server. The security server determines the RFID reader that received the unique ID of the removable medium. The security server determines a zone where the RFID reader is located. The security server checks the table to determine whether the unique ID of the removable medium is allowed in the zone where the RFID reader is located. The unique ID of the removable medium is allowed in the zone where the RFID reader is located, if the unique ID information of the removable medium, the zone information where the RFID reader that received the unique ID of the removable medium is located, and the unique ID information of the RFID reader that received the unique ID of the removable medium are all on a same row of the zone-table. The security server sounds an alarm if the unique ID of the removable medium is not allowed in the zone where the RFID reader is located.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Below are the exemplary embodiments of the method and structures according to the present invention.

Figure 1:
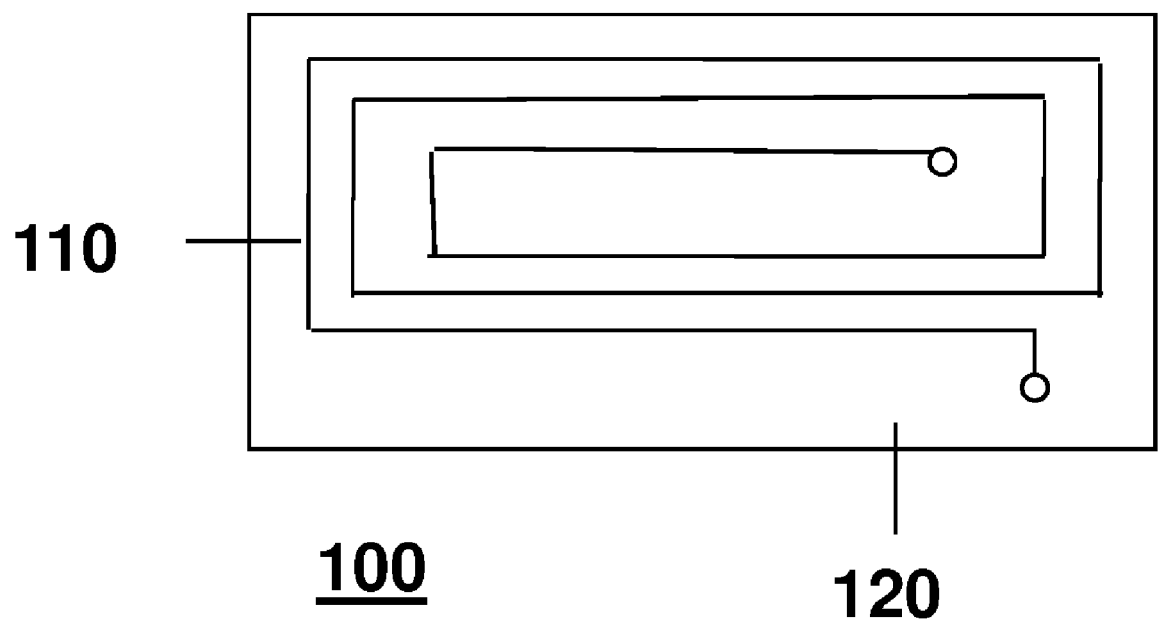
FIG. 1 illustrates a plan view of an RFID transponder according to an exemplary aspect of the present invention.

Referring now to the drawings, and more particularly to FIGS. 1-5, a removable media detection device of this invention is equipped with an RFID transponder 100. FIG. 1 shows a plan view of the RFID transponder 100, where an RFID antenna 110 can be printed on a flat circuit board 120 and attached easily to any removable media.

Accordingly, each RFID transponder 100 stores a unique ID which can be represented by a number. Thus each removable media including such RFID transponder 100 has a unique ID.

Figure 2:
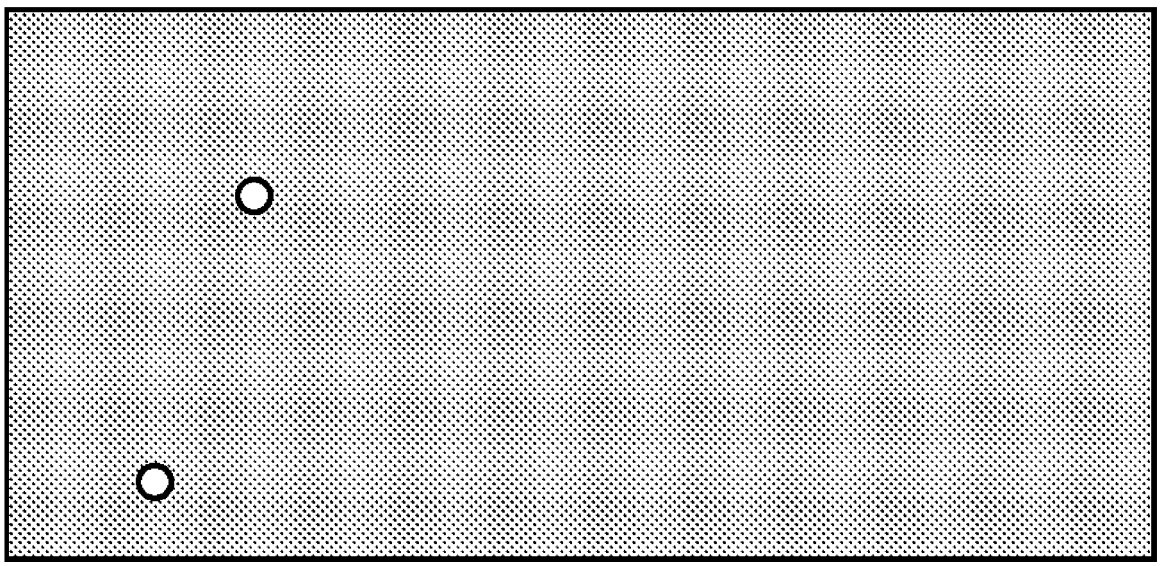
FIG. 2 illustrates an opposite plan view of the RFID transponder according to an exemplary aspect of the present invention.

FIG. 2 shows an opposite plan view of the RFID transponder 100.

Figure 3:
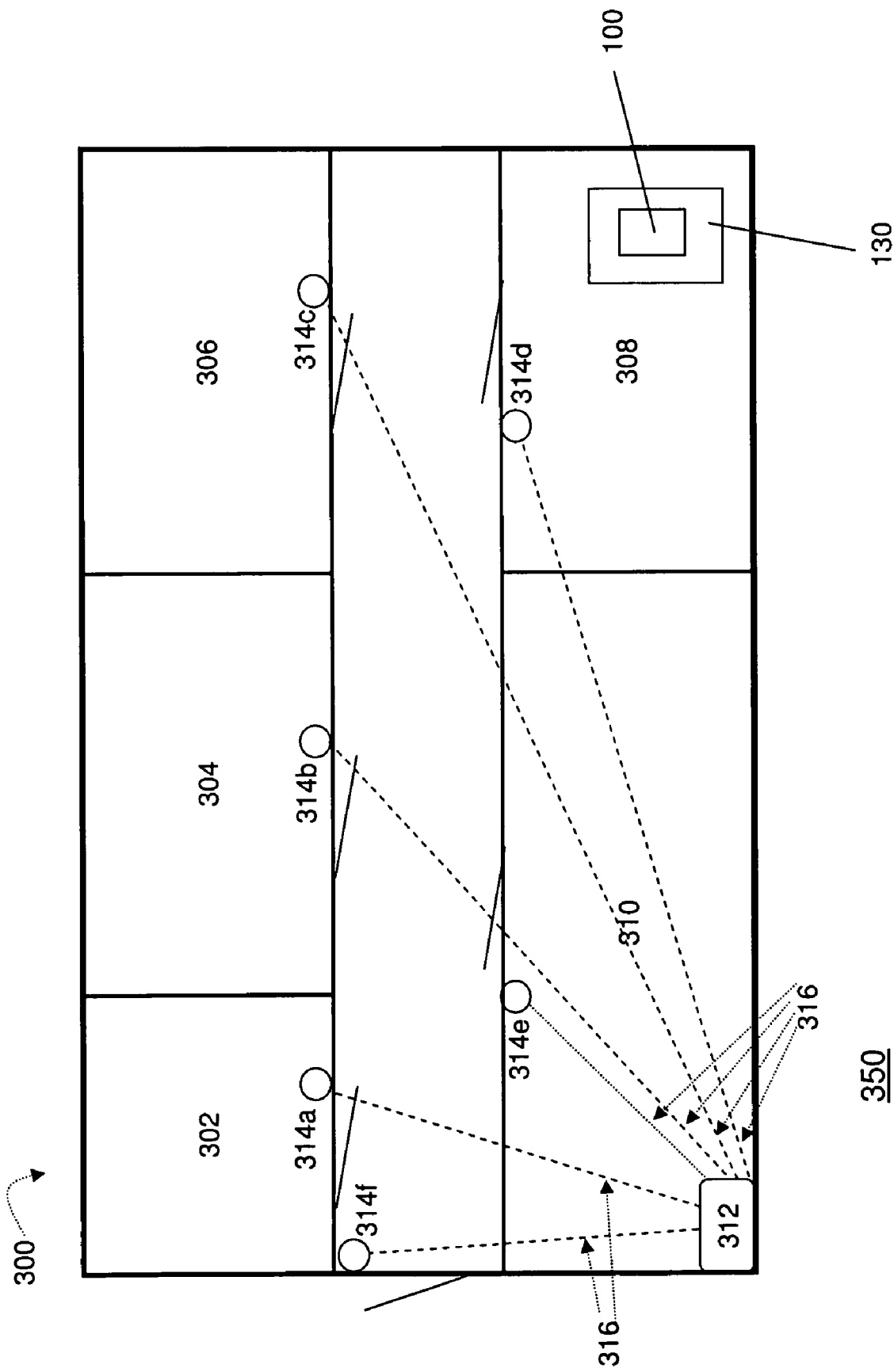
FIG. 3 illustrates a system 350 including an office 300 with security server and RFID readers according to an exemplary aspect of the present invention.

FIG. 3 shows an exemplary system 350 including an exemplary layout of an office building 300 including multiple rooms 302, 304, 306, 308 and 310, RFID readers 314a-f, and the security server 312. Within a secure area, floors or gates, RFID readers can be mounted within doorposts and other fixed interior of an office building to detect an RFID transponder 100 in a room. For example, FIG. 3 shows the RFID transponder 100 detected by an RFID reader 314d located in a room 308, and attached to removable medium 130.

The RFID readers 314 a-f are mounted in the doorposts according to this embodiment. A security server 312 is connected to the RFID readers 314a-314f via connections 316. Connections 316 can be based on Ethernet or other network protocols and infrastructure according to related art. Via connection 316, the security server gets information from the RFID readers 314a-f about unique IDs passing by the RFID readers 314a-f and associated with a removable storage media device 130. In addition the security server gets the unique ID of the RFID reader which passed said RFID reader.

Figure 4:
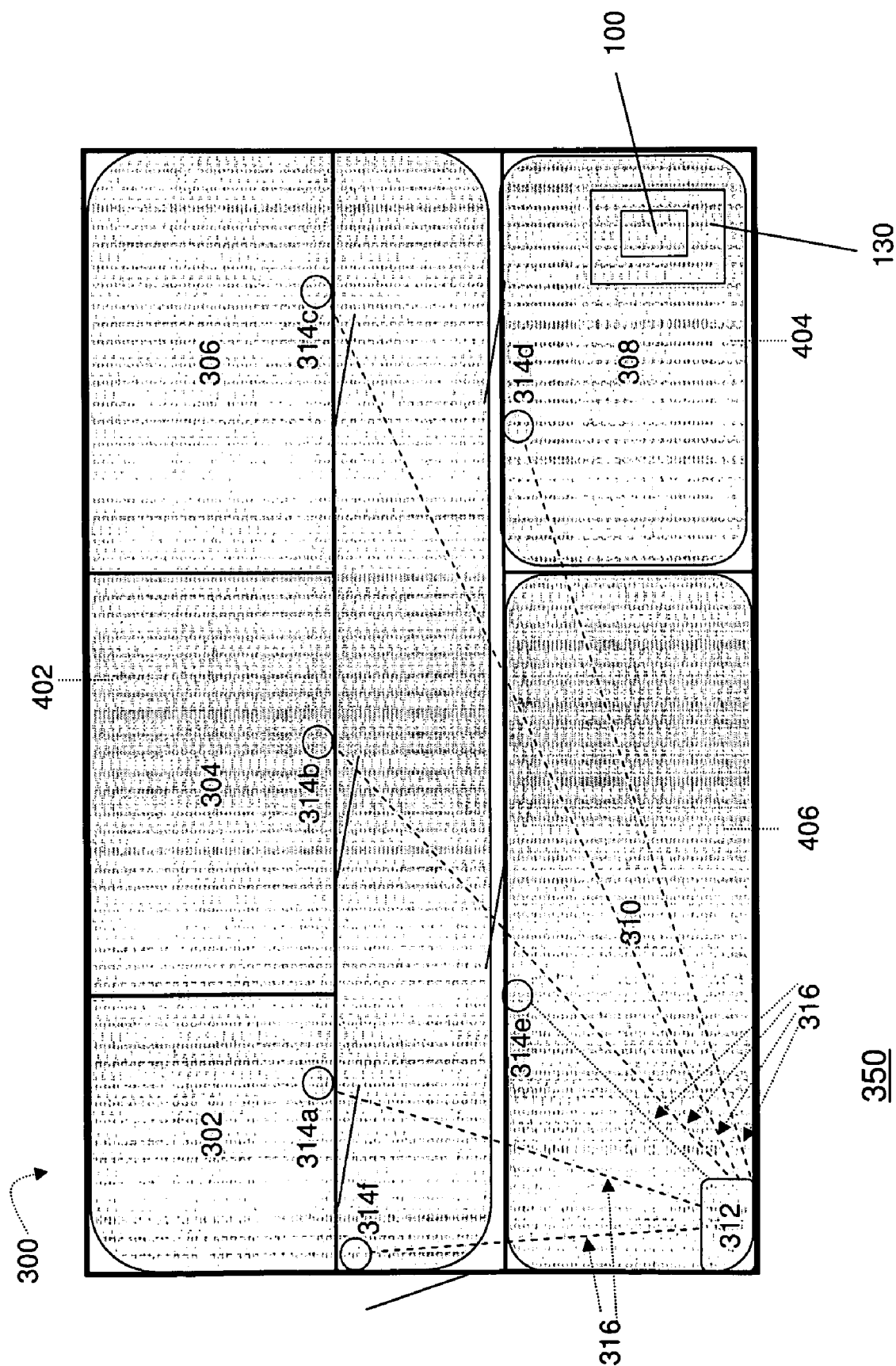
FIG. 4 illustration a system 350 including an office 300 with configured security zones according to an exemplary aspect of the present invention.

Based on the location of the RFID readers 314a-f and more precisely, based on the unique IDs of the RFID readers, the security server can be configured with security zones where each security zone has a certain security level. A security zone includes a subset of RFID readers 314a-314f. Each RFID readers 314a-314f is identified by a unique ID. Exemplary FIG. 4 shows an office 300 with three security zones 402, 404, and 406 for rooms 302, 304, 306, 308, and 310. Rooms 302, and 304, and 306 are designated to be within a first security zone 402, room 308 is designated to be within a second security zone 404, and room 310 is designated to be within a third security zone 406.

According to the example in FIG. 4 the security zone 402 includes RFID readers 314a, 314b, 314c and 314f. Security zone 404 includes RFID reader 314d and security zone 406 includes RFID reader 314e.

Also, an RFID transponder 100, attached on a removable medium 130, is located in room 308. Room 308 is designated within security zone 404, where the RFID transponder 100 may be detected by RFID reader 314d located in room 308. Ultimately and upon that detection, the RFID reader 314d send the unique ID of the removable medium 130 and its own unique ID to the security server 312.

TABLE 1 mapping removable media unique ID to security zone

| Unique ID (12) | Security Zone (14) | RFID Readers (16) |
|---|---|---|
| 1234567890 | 402 | 314a, 314b, 314c, 314f |
| 2345678901 | 402, 406 | 314a, 314b, 314c, 314f, 314e |
| 3456789012 | 402, 404, 406 | 314a, 314b, 314c, 314d, 314f, 314e |

The security server 312 is configured to include a zone-table 1, which maps the unique ID information (column 12) of the removable media to the security zone information (column 14) and the unique ID information of the RFID readers (column 16). The zone-table 1 is configured so that the unique ID information of a particular RFID transponder 100, the security zone the removable media corresponding to the unique ID of the removable media is allowed to access, and the unique ID information of the RFID readers located in the security zone in which the removable media is allowed to access, are in the same row of the zone-table.

In other words, the zone information is a subset of the RFID readers that are located within a particular zone. Each RFID reader is denoted by its unique ID.

In operation, a particular removable medium (with its corresponding unique ID) is allowed in a particular security zone if the RFID reader that detected the RFID transponder 100 on the particular removable medium (and its unique ID) is located within a security zone where said removable medium denoted by its unique ID (column 12) is configured for in table 1. When the particular removable medium (and its unique ID) is allowed in a particular security zone, the unique ID information of the removable medium, the security zone information in which the removable medium is found, and the unique ID information of the RFID reader that detected the RFID transponder 100 of the removable medium (and its unique ID) are all on the same row of the zone-table.

Conversely, a particular removable medium (with its corresponding unique ID) is not allowed in a particular security zone if the RFID reader that detected the RFID transponder 100 on the particular removable medium (and its unique ID) is not located within a security zone where said removable medium is configured for in table 1. When the particular removable medium (and its unique ID) is not allowed in a particular security zone, the unique ID information of the removable medium, the security zone information in which the removable medium is found, and the unique ID information of the RFID reader that detected the RFID transponder 100 on the particular removable medium (and its unique ID) will not be on the same row of the zone-table.

For example, according to zone-table 1, the removable medium with ID "1234567890" (column 12) is allowed in security zone 402 only, (column 14) where RFID readers 314a, 314b, 314c and 314f are also within security zone 402. Therefore, if RFID transponder on the removable medium with the unique ID "1234567890" is detected by the RFID reader information 314a, which is located in security zone 402, the removable medium is allowed within zone security 402. As can be seen on zone-table 1, the unique ID "1234567890" information, the security zone information "402", and the RFID reader information "314a" are all located on the same row of the zone-table 1.

Conversely, if this removable medium device with ID "1234567890" is transported to security zone 406, as indicated by RFID reader 314e, or security zone 404, as indicated by RFID reader 314d, the removable device is not allowed to be in either zone, and the security server sends an alarm. Here, the unique ID information "1234567890", the zone information "404, 406", and the unique ID information of the RFID readers "314e, 314d" are not on the same roll of the zone-table 1.

Figure 5:
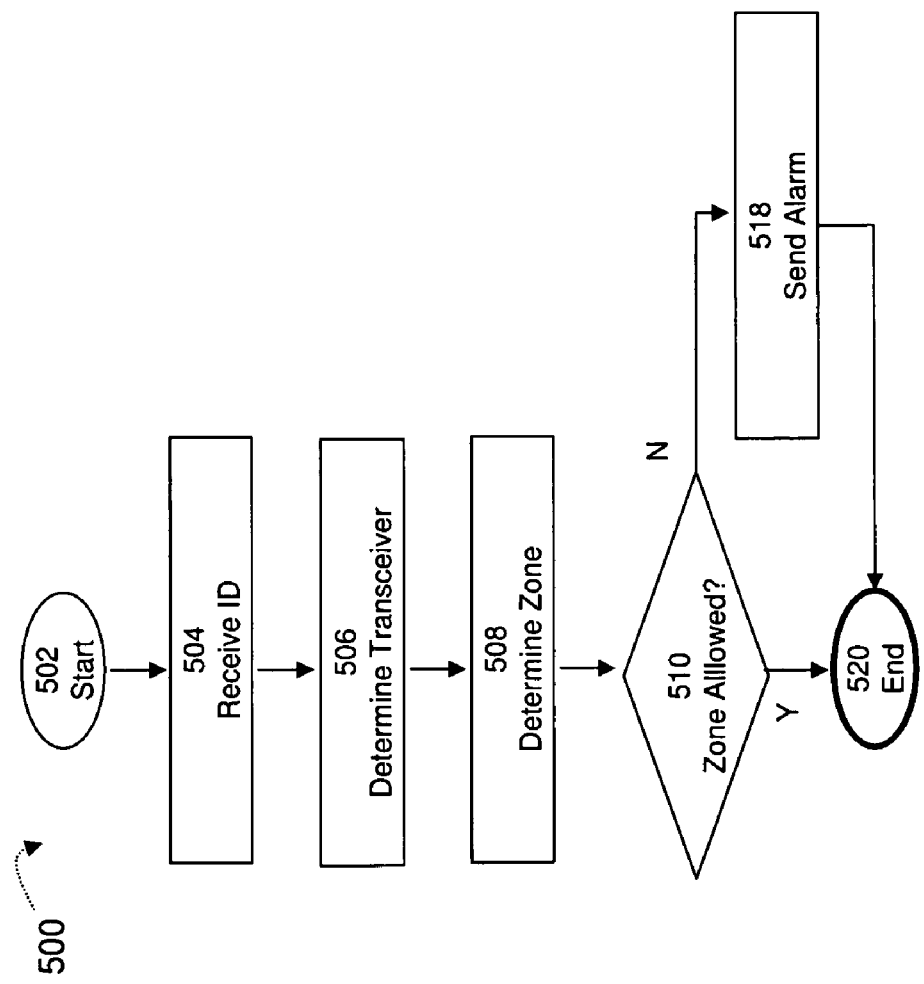
FIG. 5 illustrates a method 500 for sending an alarm by a security server according to an exemplary aspect of the present invention.

FIG. 5 presents a method 500 implemented in the security server to send an alarm according to an exemplary aspect of the present invention. This method 500 is invoked when a removable medium 130 passes a RFID reader 314a-314f.

After starting (502) the method 500 includes receiving (504) in the security server an unique ID sent by a removable media device and relayed by one of the RFID readers 314a-314f. The method 500 further includes determining (506) the RFID reader which received the unique ID based on the unique ID of the RFID reader. The method 500 further includes determining (508) the zone for the RFID reader based on the information in zone-table 1.

The method 500 further includes determining (510) by the security server, if the unique ID received in step 504 is allowed in the determined zone, thereby consulting zone-table 1 for information. More precisely, in zone-table 1 the process looks up the row which matches the unique ID of the removable medium in column 12. In this row the security server determines if the RFID reader is listed in column 16. If the RFID reader is listed the answer in determining (510) is "yes", the process continues to the ending (520). Otherwise, if the RFID reader is not listed in zone-table 1 in association with the unique ID then the answer to determining (510) is "no" and the security server sends (518) an alarm, and then the method 500 ends (520). The alarm might be a visible alarm indicated by light, it might be an audible alarm indicated by a horn or it might be a logical alarm indicated by an e-mail or SNMP notification but is not limited to this.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A media passport system, comprising:
a plurality of radio frequency identification (RFID) transponders attached to a plurality of removable mediums;
a plurality of RFID readers installed in rooms, wherein each RFID reader has a unique identification (ID); and
a security server connected to the plurality of RFID readers via a network,
wherein the security server hosts a zone-table comprising:
a unique ID information of the plurality of radio frequency identification (RFID) transponders;
a zone information determined as a subset of the unique IDs of the plurality of RFID readers; and
a unique ID information of the plurality of RFID readers,
wherein the unique ID information of the plurality of RFID transponders is mapped to the zone information and the unique ID information of the plurality of RFID readers such that the unique ID information of a particular one of said plurality of RFID transponders is included in a same row of the zone-table as a security zone to which the removable medium corresponding to the particular one of said plurality of RFID transponders is allowed access and the unique ID information of a particular one of the plurality of RFID readers located in the security zone to which the removable medium corresponding to the particular one of said plurality of RFID transponders is allowed access,
wherein each RFID transponder transmits its unique ID to an RFID reader in the plurality of RFID readers when the RFID transponder passes by the RFID reader,
wherein the RFID reader transmits the unique ID of the RFID transponder and the unique ID of the RFID reader to the security server,
wherein the security server determines the RFID reader that receives the unique ID of the RFID transponder,
wherein the security server determines a zone where the RFID reader is located,
wherein the security server checks the zone-table to determine whether the unique ID of the RFID transponder is allowed in the zone where the RFID reader is located,
wherein the unique ID of the RFID transponder is allowed in the zone where the RFID reader is located, only if the unique ID information of the RFID transponder, and the zone information where the RFID reader that received the unique ID of the RFID transponder is located are on a same row of the zone-table wherein the unique ID of the RFID transponder is not allowed in the zone, if the unique ID information of the RFID transponder and the zone information wherein the RFID reader that received the unique ID of the RFID transponder is not located on the same row of the zone table, and
wherein the security server sounds an alarm if the unique ID of the RFID transponder is not allowed in the zone where the RFID reader is located.

* * * * *